US007351457B1

(12) United States Patent
Williard

(10) Patent No.: US 7,351,457 B1
(45) Date of Patent: Apr. 1, 2008

(54) PROTECTIVE COVER SHEET FOR LABEL ASSEMBLY AND LABEL ASSEMBLY WITH SAID COVER SHEET

(76) Inventor: Rae Elise Williard, 784 State St., Millersburg, PA (US) 17061

( * ) Notice: Subject to any disclaimer, the term of this patent is extended or adjusted under 35 U.S.C. 154(b) by 58 days.

(21) Appl. No.: 11/270,699

(22) Filed: Nov. 9, 2005

(51) Int. Cl.
*B32B 9/00* (2006.01)
*G09F 3/00* (2006.01)
*B42D 15/00* (2006.01)

(52) U.S. Cl. ...................... 428/40.1; 428/42.2; 428/43; 283/81

(58) Field of Classification Search ............... 428/40.1, 428/42.2, 43; 283/81
See application file for complete search history.

(56) References Cited

U.S. PATENT DOCUMENTS 4,204,706 A * 5/1980 Blum et al. .................... 283/81
5,200,242 A * 4/1993 Hohmann ................ 428/32.13
6,001,209 A * 12/1999 Popat et al. ................ 156/249

* cited by examiner

*Primary Examiner*—Patricia L Nordmeyer
(74) *Attorney, Agent, or Firm*—Hooker & Habib, P.C.

(57) ABSTRACT

A cover sheet for protecting unprinted labels of a label assembly includes a number of removable shields that overlie the unprinted labels during printing.

16 Claims, 3 Drawing Sheets

FIG. 5
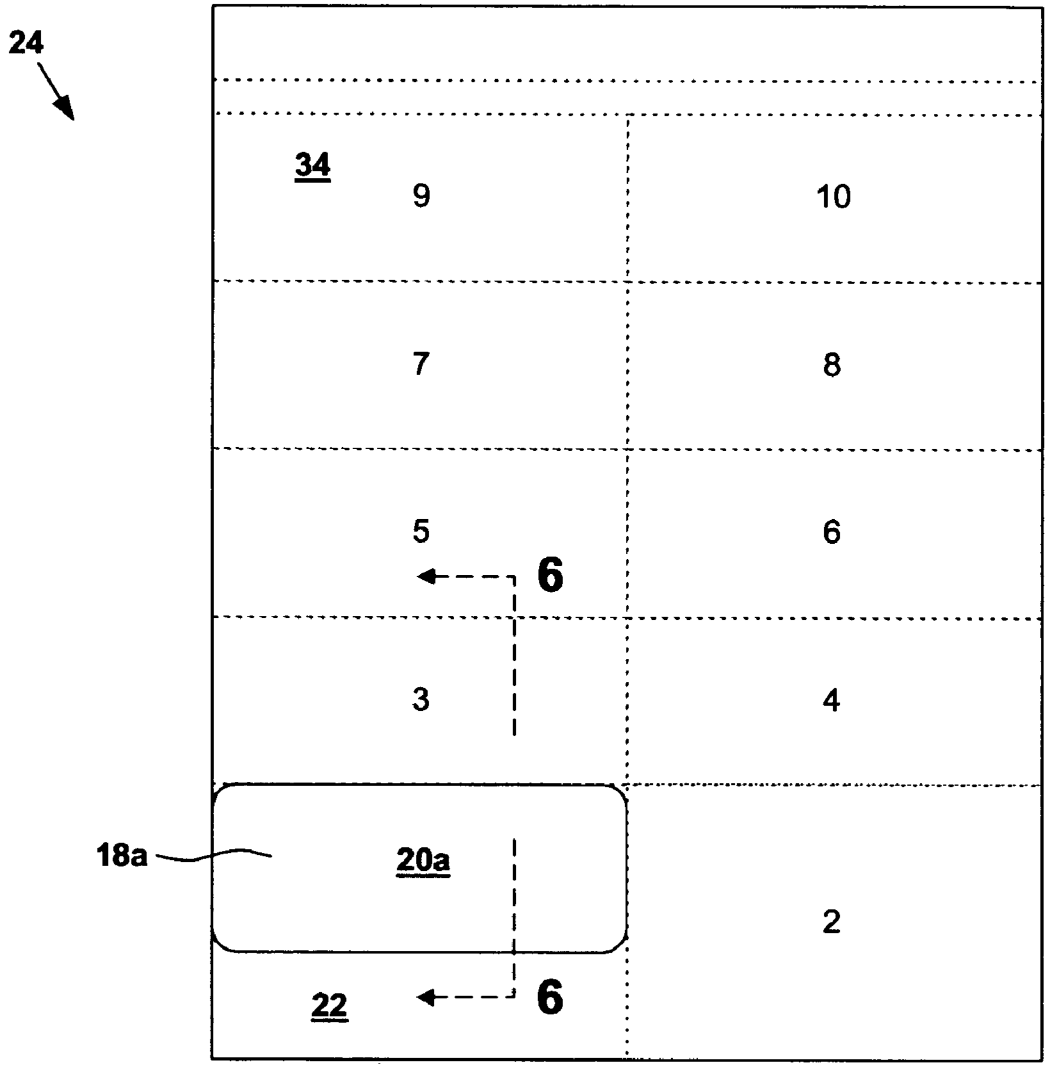
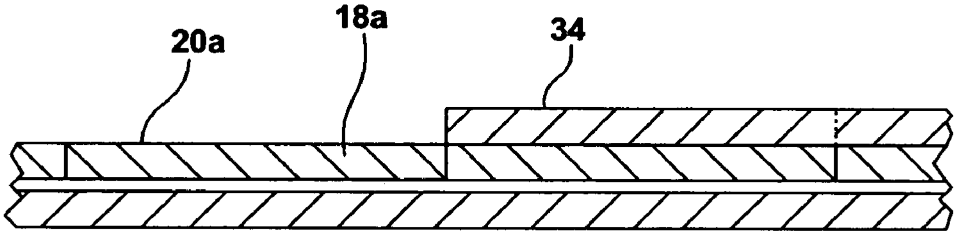
FIG. 6

PROTECTIVE COVER SHEET FOR LABEL ASSEMBLY AND LABEL ASSEMBLY WITH SAID COVER SHEET

FIELD OF THE INVENTION

The invention relates to label sheet assemblies that provide multiple labels for printing with a laser, inkjet, or dot matrix printer.

DESCRIPTION OF THE PRIOR ART

A common use of home and office printers is printing sheets of labels. The labels are die-cut in a label sheet that adheres to a backing sheet to form a label assembly. Labels are provided in a number of different shapes and sizes, and are usually arranged in rows and columns on the backing sheet.

Label sheets are typically sized as a standard page size (eight and one-half inches by eleven inches in the United States, or A4 size in many other countries) and the sheets are fed individually through the printer. The printer prints on one or more of the labels, and the printed labels are removed from the backing sheet for use.

Often only some of the labels are printed and the remaining labels remain unprinted and can be reused. Word processors are programmed to recognize the layout of common label sheets, and can print on selected labels of the sheet. Label sheets can be run through the printer multiple times, with the word processor printing only to those labels remaining on the sheet.

Multiple runs through the printer, however, often soils the unprinted labels with ink or toner. If the soiling is sufficiently severe, the unused labels turn gray from excess toner residue and may have to be discarded. Being unable to use all the labels on a sheet is wasteful and increases printing costs.

Thus there is a need for protecting unprinted labels from soiling during printing.

SUMMARY OF THE INVENTION

The present invention is a cover sheet that protects unprinted labels from soiling during printing.

The cover sheet in accordance with the invention is subdivided into a number of removable shields. Each shield overlies a respective label. Shields overlying labels to be printed are removed to expose selected labels for printing. The remaining shields cover the unprinted labels during printing to resist soiling of unprinted labels. The unprinted labels remain clean and usable even if the label sheet goes through the printer multiple times.

In preferred embodiments the cover sheet adheres to the label sheet. The cover sheet can be provided as part of the label assembly by the manufacturer, or can be provided separately and attached to the label assembly by the user before printing. The cover sheet also protects each label's printing surface during storage.

The label cover sheet allows all the labels of a label sheet to be used, even if only a few labels are printed at a time. Label sheets can be run through the printer multiple times without soiling unprinted labels, and wasted labels caused by soiling are eliminated.

Other objects and features of the invention will become apparent as the description proceeds, especially when taken in conjunction with the accompanying three drawing sheets illustrating an embodiment of the invention.

BRIEF DESCRIPTION OF THE DRAWINGS

FIG. 5 is a view similar to FIG. 4 but with one shield removed from the cover sheet for printing on one label of the label assembly; and FIG. 6 is a partial sectional view of the assembly shown in FIG. 5 taken along lines 6-6 of FIG. 5.

DESCRIPTION OF THE PREFERRED EMBODIMENT

Figure 1:
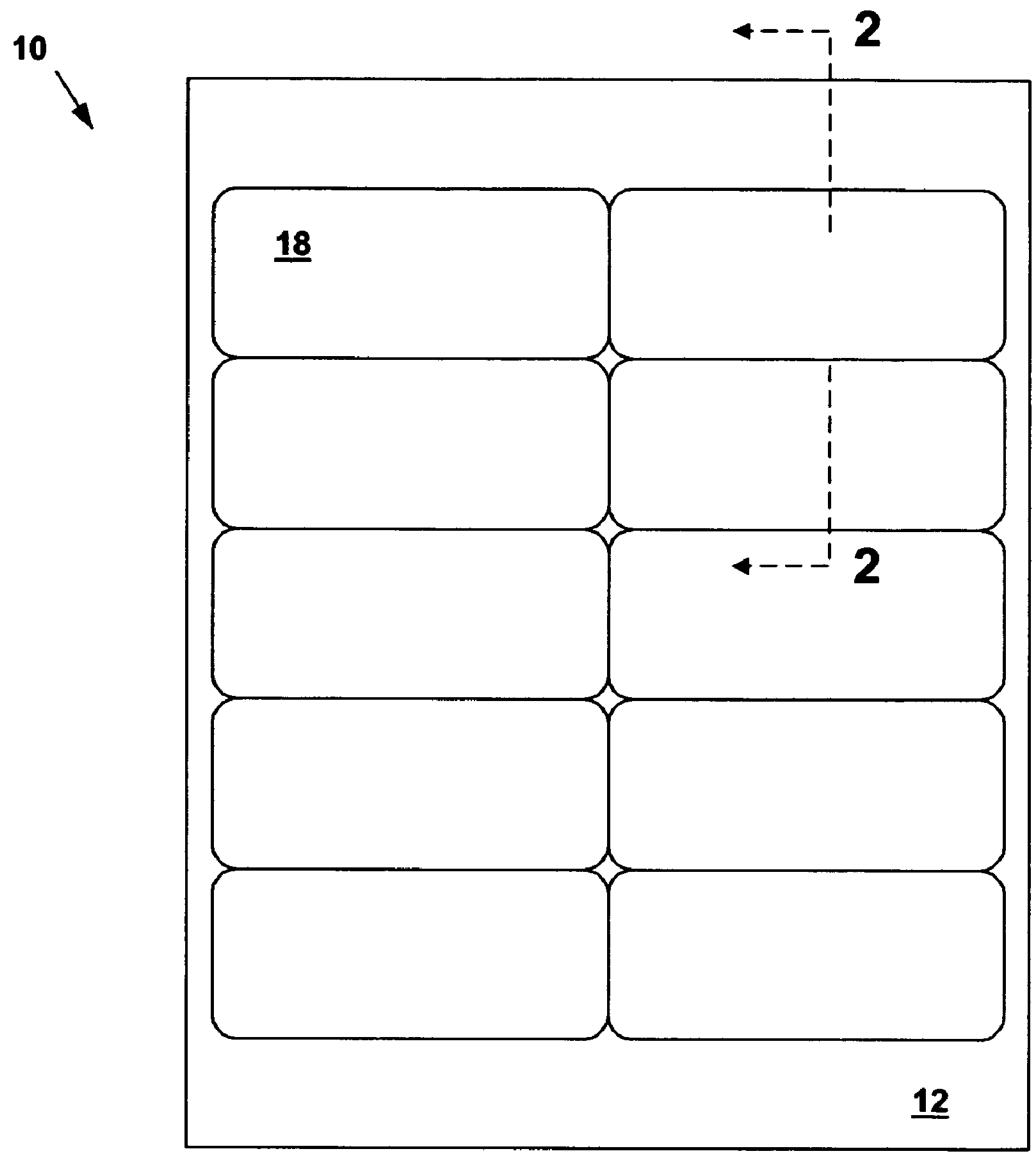
FIG. 1 PRIOR ART
FIG. 1 is a front view of a conventional double-sheet label assembly.
Figure 2:
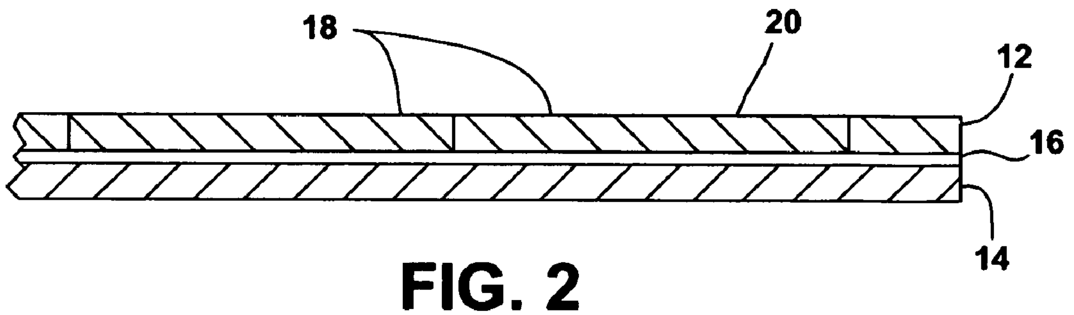
FIG. 2 PRIOR ART
FIG. 2 is a partial sectional view of the label assembly shown in FIG. 1 taken along lines 2-2 of FIG. 1.

FIGS. 1 and 2 illustrate a conventional double-sheet label assembly 10 that can be used with the cover sheet of the present invention.

Label assembly 10 includes a label sheet 12, a backing sheet 14, and a pressure-sensitive adhesive 16 between the label and backing sheets. The label sheet is die-cut into a set of labels 18 having a printing surface 20. The adhesive permits a user to remove a printed label from the backing sheet. Label assembly 10 is intended for use with laser printers and can withstand the temperatures of up to 200 degrees Fahrenheit of the laser printing environment.

The illustrated label sheet 12 has a standard sheet size of either eight and one-half inches by eleven inches or A4 size. The label sheet has ten labels arranged in a predetermined configuration of two columns of five rows. Other sheet sizes, label sizes, and label layouts are available and are readily adapted for use in accordance with the present invention.

Figure 3:
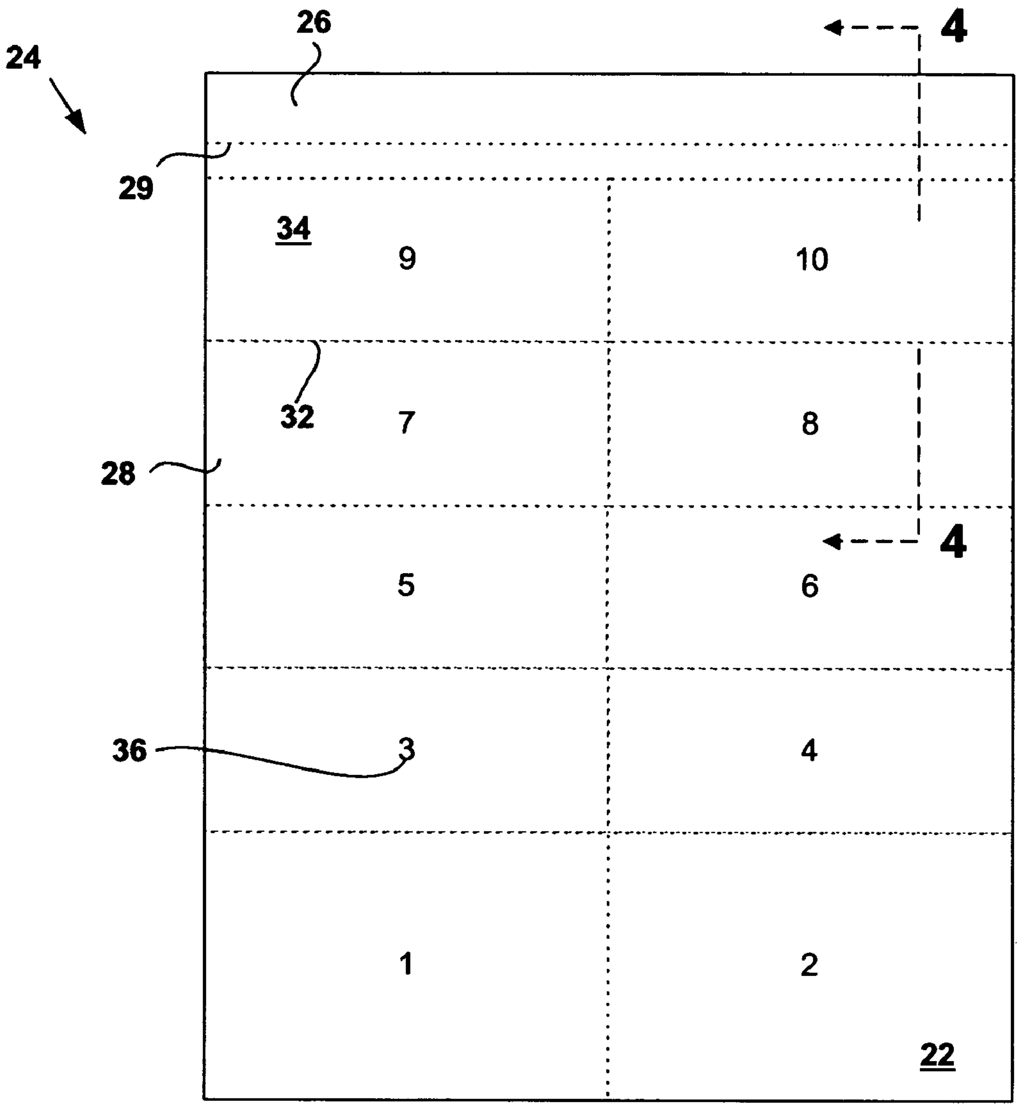
FIG. 3 is a front view of a triple-sheet label assembly having the double-sheet label assembly shown in FIG. 1 and a first embodiment protective cover sheet in accordance with the present invention.
Figure 4:
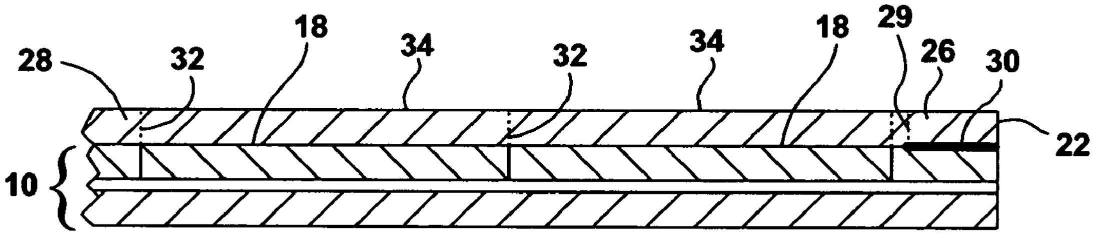
FIG. 4 is a partial sectional view of the label assembly shown in FIG. 3 taken along lines 4-4 of FIG. 3.

FIGS. 3 and 4 illustrate a cover sheet 22 in accordance with the present invention that is used with label assembly 10. Cover sheet 22 is made from paper stock and is sized to completely cover label sheet 12 to form the three-sheet label assembly 24 shown in the figures. Other types of sheet materials that can resist a laser printer environment can also be used to form cover sheet 22.

Cover sheet 22 includes an attachment portion 26 and a shield portion 28 separated by an intermittent die-cut line 29. Attachment portion 26 adheres the cover sheet to the label sheet by pressure adhesive 30. Adhesive 30 either permanently attaches attachment portion 26 to the label sheet or detachably attaches attachment portion 26 to the label sheet as desired. For example, a permanent adhesive might be used to form pre-formed assemblies 24. A detachable adhesive might be applied to cover sheet 22 to enable a user to attach cover sheet 22 to a pre-existing label assembly 10. Line 29 enables the attachment portion 26 to be completely removed without the risk of adhesive 30 tearing the label sheet. If desired, line 29 can be eliminated and the perforation line joining the upper row of labels to attachment portion 26 is used to remove the entire shield portion 28.

Shield portion 28 does not adhere to the label sheet and overlies the set of labels 18. Shield portion 28 is divided by intermittent die-cut lines 32 into a set of detachable, rectangular-shaped shields 34. Each shield 34 overlies a respective label 18 of the assembly 10 and is preferably printed with indicia 36 that uniquely identifies each shield.

Lines 32 preferably extend to the edges of the sheet 22 as shown in FIG. 3 to facilitate removal of the shields. Some or all of the die-cut lines 32 can end inwardly of the edges of sheet 22 in other embodiments if the labels are surrounded by an outer margin of the label sheet. Lines 32 can also define shields 34 having other shapes, including rounded rectangles, circles, and the like to accommodate other label shapes and label layouts.

FIGS. 5 and 6 illustrate assembly 24 after one shield has been removed from cover sheet 22 to permit printing on a single label 18*a*. Preferably labels are used from the trailing end of the label sheet towards the leading end of the sheet. Removing the shield exposes label print surface 20*a*, while the remaining shields cover the unprinted labels. Label assembly 24 is fed through the printer for printing label 18*a*, and the other labels remain covered during the print process. If more than one label is to be printed, multiple shields are removed as necessary.

To print on other of the remaining labels of label assembly 24, the appropriate shields are removed from cover sheet 22. If all the labels are to be printed at once, or all remaining labels are to be printed in a later print run, cover 22 can be removed or shield portion 28 is removed at line 29 for printing label assembly 10 in a conventional manner.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A label sheet assembly for printing one or more labels, the assembly comprising:

a backing sheet, a label sheet, and a cover sheet;

the label sheet covering the backing sheet and subdivided into a plurality of labels cut into the label sheet without gaps between the labels, each label removably adhering to the backing sheet;

the cover sheet covering the label sheet and subdivided into a plurality of removable shields, each shield overlying a respective label without overlapping an adjacent label, no adhesive between each shield and the respective label of said shield;

whereby shields overlying labels to be printed are removed from the cover sheet prior to printing and the remaining shields cover the unprinted labels during printing to resist soiling of the unprinted labels.

2. The label sheet assembly of claim 1 wherein the cover sheet comprises a shield portion containing the shields and an attachment portion adhering the cover sheet to the label sheet.

3. The label sheet assembly of claim 2 having a leading edge, the attachment portion at the leading edge.

4. The label sheet assembly of claim 2 wherein the cover sheet comprises a cut line separating the attachment portion from the shield portion whereby the entire shield portion can be removed at the cut line for simultaneously printing all labels.

5. The label sheet assembly of claim 1 wherein the plurality of labels are arranged in a plurality of rows and columns.

6. The label sheet assembly of claim 1 having width and length dimensions equal to a standard sheet size.

7. The label sheet assembly of claim 1 wherein the cover sheet comprises a plurality of cut lines subdividing the cover sheet into said shields.

8. The label sheet assembly of claim 1 comprising materials that are stable in temperatures experienced in a laser printing environment.

9. The label sheet assembly of claim 1 wherein each shield is printed with identifying indicia.

10. A protective cover sheet for protecting unprinted labels of a multi-label sheet assembly during printing, the labels arranged edge-to-edge without gaps between adjacent labels, the cover sheet comprising:

width and length dimensions sufficient to overly the labels of the multi-label sheet assembly when covering the multi-label sheet in an overlying position;

a shield portion comprising a plurality of removable shields, each shield to overly a respective label when the cover sheet is in the overlying position and sized not to overlap an adjacent label, each shield comprising a surface to face the respective label when the cover sheet is in the overlying position, no adhesive on said surface; and an attachment portion for attaching the cover sheet to the multi-label sheet assembly in the overlying position during printing, the attachment portion at a leading edge of the cover sheet.

11. The cover sheet of claim 10 comprising attachable-detachable adhesive on the attachment portion to adhere the cover sheet to the label sheet assembly.

12. The cover sheet of claim 10 comprising perforations extending through the thickness of the cover sheet and detachably joining the shields.

13. The cover sheet of claim 10, the label assembly of the type that comprises a label sheet and a backing sheet, wherein the cover sheet is sized to overlie the label sheet.

14. The cover sheet of claim 10 comprising adhesive on the attachment portion, the adhesive stable in temperatures experienced in a laser printing environment.

15. The cover sheet of claim 10 wherein the shields are arranged in a plurality of rows and columns.

16. The cover sheet of claim 10 wherein each shield is printed with respective indicia.

* * * * *